United States Patent [19]

Wdzieczkowski

[11] 3,892,489
[45] July 1, 1975

[54] DATA ACQUISITION SYSTEM

[75] Inventor: Francis E. Wdzieczkowski, Barrington, N.J.

[73] Assignee: SmithKline Corporation, Philadelphia, Pa.

[22] Filed: Aug. 17, 1973

[21] Appl. No.: 389,113

[52] U.S. Cl. .................. 356/157; 356/36; 356/244; 235/151.3
[51] Int. Cl. .......................................... G01b 11/08
[58] Field of Search ............... 340/172.5; 235/151.3; 356/157, 158, 244, 36

[56] References Cited
UNITED STATES PATENTS

| | | | |
|---|---|---|---|
| 3,449,586 | 6/1969 | Serra | 356/158 |
| 3,551,052 | 12/1970 | Reiber | 356/158 X |
| 3,557,352 | 1/1971 | Hogg et al. | 235/151.3 |
| 3,694,635 | 9/1972 | Hoetzel et al. | 235/151.3 |
| 3,717,753 | 2/1973 | Thomas | 235/151.3 |
| 3,778,166 | 12/1973 | Pease et al. | 356/157 |

*Primary Examiner*—Gareth D. Shaw
*Assistant Examiner*—Mark Edward Nusbaum
*Attorney, Agent, or Firm*—Smith, Harding, Earley & Follmer

[57] ABSTRACT

In antibiotic testing, inhibition zone data are electromechanically transmitted from a zone reader to accumulating and totalizing means, and to off-line recording means. Rapid and error-free acquisition of data is insured by automatic sequencing means which provides for temporary storage and display of a standard value, temporary storage and display of an unknown value, visual verification of both values, and simultaneous transmission of both values.

5 Claims, 2 Drawing Figures

3,892,489

DATA ACQUISITION SYSTEM

BACKGROUND OF THE INVENTION

This invention relates to the acquisition of data in antibiotic testing, and particularly to a data acquisition system intended for use in conjunction with optical zone readers for the rapid and error-free processing of zone dimension data.

In antibiotic testing, the strength of an antibiotic is determined by a technique known as "bio-assay", in which a disc of filter paper carrying a measured amount of the antibiotic being tested, is placed in a Petri dish prepared with agar and inoculated with bacteria. After incubation, the bacteria cover the entire dish except for a circular inhibition zone around the disc the diameter of which is a measure of the strength of the antibiotic. In order to obtain statistically reliably data, numerous such discs must be tested, and numerous zones must be measured. Ordinarily, measurement is carried out by means of an optical instrument known as a zone reader. In a typical zone reader, a light beam is passed upwardly through the Petri dish, and then reflected by a mirror supported on an arm above the instrument. The mirror reflects the light beam to a glass prism mounted at the front of the instrument, and a magnified image of the inhibition zone is viewed in the prism. The zone reader is provided with an adjustment for moving the Petri dish and thereby moving the image of the inhibition zone across a reference line. The measurement of the diameter of a zone of inhibition is effected by first adjusting the position of the zone of inhibition until the edge of its image touches the reference line, and then, by means of a second adjustment, moving the image across the reference line. The second adjustment moves a scale, and the diameter of the zone of inhibition may be read from the scale.

The strength of an unknown antibiotic is usually determined by comparison of its zone of inhibition with the zone of inhibition produced by an antibiotic of known strength. Typically, six discs of filter paper are placed in a circle on a Petri dish. These discs are impregnated with known and unknown antibiotics in alternation so that, as the Petri dish is rotated on the zone reader, zones of inhibition corresponding to known and unknown antibiotics are read in pairs. Bio-assay requires very large numbers of measurements, and, heretofore, two operators were required, one for operating the zone reader and reading the diameters of the zones of inhibition, and the other for recording the data read by the first operator on an adding machine. The strain thus imposed upon the powers of concentration of both operators inevitably led to errors. In addition, the process was inherently slow because of the time required for the first operator to read the dial of the zone reader to the other operator, and for the other operator to punch the number so read into the adding machine.

The general object of this invention is to provide for the rapid and error-free acquisition of bio-assay data by a single operator. In accordance with the invention, zone diameter readings derived from an optical zone reader are electromechanically transmitted to one or more recording means through processing circuitry which provides for the temporary storage and display of an electrical representation of the zone diameter so that it may be verified by the operator, and for recording of the temporarily stored representation. Readings taken on the zone reader are thereby automatically recorded, and do not have to be passed by word of mouth from one operator to another.

In order to facilitate the accurate recording of pairs of readings, the processing circuitry is preferably provided with first and second temporary storage means, and sequencing means for effecting temporary storage by the first storage means of a representation of the diameter of the first of a pair of successively measured zones, effecting temporary storage of a representation of the diameter of the second zone of said pair, and effecting recording of the stored representation simultaneously. The relationship between the two readings of a pair is thereby accurately preserved. The contents of the first and second storage means are preferably displayed to give the operator an opportunity to verify the accuracy of the stored readings before they are recorded.

The sequencing means is preferably made responsive to operator-initiated impulses so that the operator may control the temporary storage and recording of data. For simplicity, the sequencing means is preferably made responsive to identical operator-initiated impulses for performing the various different operations which take place in conjunction with the reading of a pair of inhibition zones.

Desirably, in order to save steps for the operator, the recording apparatus automatically provides a signal when a recording step has taken place, and means are provided which are responsive to this signal for resetting the sequencing means. The signal which is provided by the recording means is also desirably used to provide an indication that the system is ready for the temporary storage of another reading.

More than one recording device may be provided in the data acquisition system in accordance with the invention. For example, data may be recorded in an accumulator-totalizer such as a tape adding machine, and also on punched tape, magnetic tape, or on other recording media. The accumulator-totalizer may be used by the operator for making calculations on short runs of data, while the tape may be processed by means of a digital computer in order to derive more elaborate statistical information. When two or more such recording means are provided, the processing circuitry desirably derives a signal from a first of the recording means when recording has taken place therein and effects recording of the same data on the second recording means in response to said signal.

Various additional objects of the invention will appear from the following detailed description when read in conjunction with the drawing.

DETAILED DESCRIPTION

Figure 1:
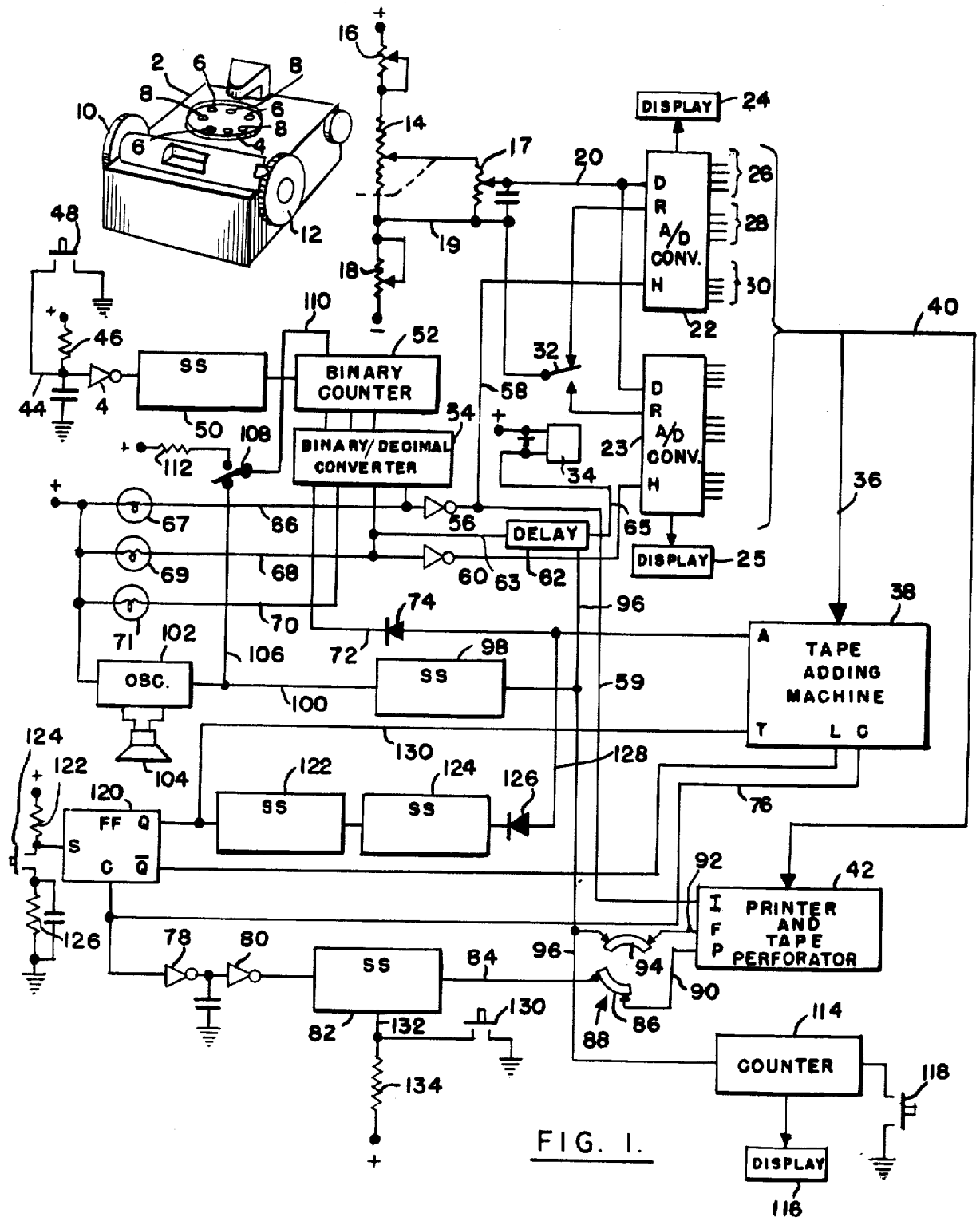
FIG. 1 is a schematic diagram of the data acquisition system in accordance with the invention.

In the drawing, there is shown an antibiotic zone reader 2 of the type well-known in the art. (The model 290 Fisher-Lilly Antibiotic Zone Reader, available from Fisher Scientific Company, 711 Forbes Avenue, Pittsburgh, Pa., is typical, and reference may be made to the instrument itself or to the instruction sheet for Fisher part No. 14539, published in November, 1971, for a more detailed disclosure thereof.) On a platform on the top of the zone reader, there rests a Petri dish 4 in which six discs of filter paper are arranged in a circle. Discs 6 are impregnated with standard antibiotics, and discs 8 are impregnated with the antibiotic being tested. The alternating arrangement of discs 6 and 8 allows the successive measurement of inhibition zones corresponding to antibiotics of known and unknown strengths. A "zero adjustment" wheel 10 adjusts the position of Petri dish 4 to permit the alignment of an edge of a zone to be measured with a reference line. After wheel 10 is adjusted, final adjustment wheel 12 is adjusted to cause the image of the zone being measured to traverse the reference line. Normally, the diameter of the measured zone would be read from a scale on the periphery of wheel 12. However, in accordance with the invention, wheel 12 is mechanically coupled to a variable resistor 14. The resistive element of variable resistor 14 is energized electrically through variable resistors 16 and 18 respectively from positive and negative supply terminals, and an electrical output is derived between the wiper of variable resistor 14 and the lower end of its resistive element, the latter being connected to line 19. The resistive element of variable resistor 17 is connected between line 19 and the wiper of variable resistor 14, and an electrical signal is derived at line 20 from the wiper of variable resistor 17, a return being provided to line 19. Variable resistors 16, 17 and 18 are for the purpose of calibration. The voltage amplitude of the electrical signal appearing between lines 20 and 19 is an analog representation of the extent of movement of final adjustment wheel 12. Thus, when wheel 12 is moved to an extent such that a zone being measured completely traverses the reference line, the voltage between lines 20 and 19 represents the diameter of the zone.

Indicated at 22 and 23 are two analog-to-digital converters of a kind well-known in the art of digital circuitry. (A typical converter is described in Malmstadt and Enke, *Digital Electronics for Scientists*, W. A. Benjamin, Inc., 1969, at pp. 342–344.) Analog data is received at terminal D, and a return is provided at R. The analog voltage appearing between terminals D and R is converted to binary-coded decimal (BCD) form in the converter, and groups of output terminals 26, 28 and 30 are selectively energized in accordance with the voltage between input terminals D and R. Grounding of the H terminal of the analog-to-digital converter causes it to store data temporarily until the H terminal is again ungrounded. Thus, when terminal H is switched to ground, the output lines are selectively energized in accordance with the voltage between terminals D and R at the time terminal H was switched to ground, and remain so energized until terminal H again receives a positive signal. Converters 22 and 23 are respectively provided with display means 24 and 25 which display the representations stored in the converters in digital form. (For a more detailed disclosure of the manner in which the display means may be operated by the analog-to-digital converters, see Malmstadt and Enke, pages 342, 247 and 250.) The return terminals R of converters 22 and 23 are alternatively connectable to line 19 through contacts 32 of relay 34. The purpose of contacts 32 is to prevent the sampling circuits of the converters from interfering with each other.

The digital information at the outputs of both analog-to-digital converters is delivered through cable 36 to tape adding machine 38 and through cable 40 to a printer and tape perforator 42. Both the tape adding machine and the printer and tape perforator are provided in order to record the information derived from the zone reader and digitized by the converters. Tape adding machines adapted to receive and operate on electrical data in BCD form are well-known in the art. A typical remote-controlled tape adding machine is described in U.S. Pat. No. 2,497,784, dated Feb. 14, 1950. Terminal A is an "accumulate" terminal, the energization of which causes the adding machine to enter the number represented in cable 36 into the accumulator. Terminal T is a "totalize" terminal which, if simultaneously energized with the accumulate terminal A, causes the totalizing of all of the numbers accumulated in the accumulator since the last totalize operation. Terminal L is a "locking" terminal which is provided for the reception of a signal which locks a "plus" solenoid out of operation. This lock out operation is necessary when taking total in machine 38. Terminal C provides a positive-going output when the adding machine is going through its cycle. This output is used to control the operation of printer and tape perforator 42.

Printer and tape perforator 42 is of the conventional electromechanical type, such as a Teletype Corporation Model KSR 33, and preferably suitable for punching the data in cable 40 onto a tape in a format compatible with a digital computer which may be used for further processing. Terminal I of printer and perforator 42 is an "inhibit" terminal, the purpose of which is to prevent the printer and tape perforator 42 from printing and punching the numbers represented in cable 40 when the tape adding machine 38 is going through a totalizing operation. Terminal P receives the "print command" for the printer and tape perforator 42, and terminal F delivers a signal when printing and perforating is completed for a particular pair of readings.

Line 44 is normally held at a positive potential by its connection through resistor 46 to a positive supply terminal. However, a normally open push-button 48 is connected between line 44 and ground, and the operator, by depressing push-button 48, may initiate an impulse in line 44 which will effect certain operations of the storage and recording means just described. Line 44 is connected through inverting amplifier 49 to single shot (or monostable multi-vibrator) 50. The output of single shot 50 is delivered to the input of a binary counter 52. Binary counter 52 has three outputs which are converted to decimal form in the conventional manner by the logic circuitry contained within binary/decimal converter 54. (A typical binary/decimal converter is described in Signetics Digital 54/7400 Data Book at page 49).

Binary/decimal converter 54 has four outputs. The energization of these four outputs is always such that three of the outputs are at a high potential, and one is at a relatively low potential. As the count in counter 52 progresses, the output of converter 54 having the relatively low potential moves from the right hand output connected to inverting amplifier 56 toward the left progressively.

Amplifier 56 is a common emitter inverting amplifier of the conventional type in which the output is taken from the collector. At the beginning of an operation, the output of converter 54 connected to the input of amplifier 56 is low. This condition causes the output of amplifier 56 to be disconnected from ground, thus ungrounding the H input of converter 22, which is connected to the output of amplifier 56 through line 58. The output of amplifier 56 is also connected to the inhibit terminal I of printer and tape perforator 42 through line 59.

Figure 2:
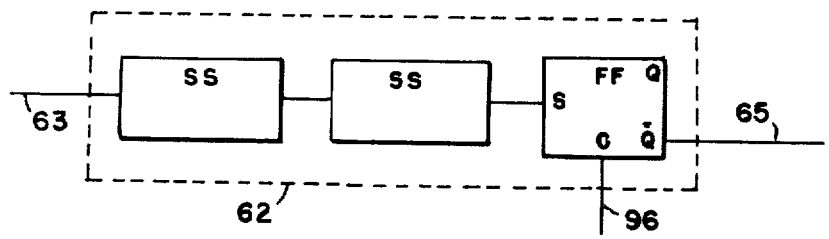
FIG. 2 is a schematic diagram showing details of the delay circuit which is shown in FIG. 1.

The second output line of converter 54 is connected to the input of inverting amplifier 60, the output of which is connected to the H terminal of converter 23. This output of converter 54 is also connected through delay circuit 62 to a terminal of relay 34, the other terminal of which is connected to a positive supply. As shown in FIG. 2, delay circuit 62 comprises a pair of single shots followed by a flip-flop, the flip-flop being resettable through line 96. Shortly after the second output of converter 54, at line 63, goes to a relatively low potential, the coil of relay 34 is energized and pulls contacts 32 so that line 19 is connected to the R terminal of converter 23. The output of amplifier 60 goes to a high condition, allowing converter 23 to receive data from the zone reader and to convert it into BCD form. Delay circuit 62 insures that the representation in converter 22 is held before contacts 32 switch the return line away from converter 22.

The first, second and third outputs of converter 54 are connected respectively to indicator lamps 67, 69 and 71. These indicator lamps serve to inform the operator of the condition of counter 52.

The fourth output of converter 54 is connected through line 72 and diode 74 to the accumulate input A of tape adding machine 38.

The C output of tape adding machine 38 is connected to the input of a pair of inverting amplifiers 78 and 80. The output of amplifier 80 is connected to the input of single-shot 82. The output of single-shot 82 is connected through line 84 and conductive element 86 of switch 88 and through line 90 to the P input of printer and tape perforator 42. The signal derived from the F terminal of printer and tape perforator 42 is delivered through line 92, conductive element 94 of switch 88, and line 96 to the input of single-shot 98, the output of which at line 100 is delivered to an audio oscillator 102 having its output connected to a loudspeaker 104. The output of single-shot 98 is also connected through line 106, switch 108 and line 110 to a resetting input of counter 52. When counter 52 is reset, the low output of converter 54 is the output which is connected to the input of amplifier 56. Switch 108 provides for the alternative connection of line 110 to a positive supply through resistor 112 for manual resetting of counter 52.

Line 96 is also connected to the input of counter 114. Counter 114 is provided with a display 116, and a resetting push button 118.

Flip-flop (or bistable multivibrator) 120 has its set input S connected to a positive supply terminal through resistor 122. The set terminal is connected through normally open push button 124 and resistor 126 to ground so that, its potential may be brought to a lower level by the momentary depression of push button 124. The Q output of flip-flop 120 is connected to the input of a pair of single shots 122 and 124 connected in series. The output of single-shot 124 is connected through diode 126 and line 128 to the accumulate input A of tape adding machine 38. The $\bar{Q}$ output of flip-flop 120 is also connected through line 130 to the totalize input T of tape adding machine 38. The Q output of flip-flop 120 is connected to the lock input of L of tape adding machine 38. The C terminal of tape adding machine 38 is connected through line 76 to the clock input C of flip-flop 120, so that flip-flop 120 is reset at the end of the cycle of the tape adding machine.

Zone diameter readings are taken in the following manner. Zone reader 2 is set up and operated essentially in the conventional manner except that information is not read from the scale on wheel 12 except for visual verification of the information displayed on displays 24 and 25.

Initially, binary counter 52 is in a condition such that the output of converter 54 which is connected to amplifier 56 is at a relatively low potential. Analog-to-digital converter 22 is enabled through its H terminal so that, as final adjustment wheel 12 is rotated, the display at 24 and the digital information at the output of converter 22 follows the position of wheel 12.

As soon as the first inhibition zone of a pair has been traversed, the operator initiates an impulse in the system by momentarily depressing push button 48. Converter 54 shifts so that the output connected to amplifier 60 goes to a relatively low potential. This energizes relay 34 and enables analog-to-digital converter 23. As the same time, the H terminal of converter 22 is connected to ground through a transistor in the output circuit of amplifier 56 so that an electrical representation of the diameter of the first measured zone is stored in converter 22. The diameter of the first measured zone remains displayed on display 24, and the output lines of converter 22 are selectively energized in a BCD representation of the first measured zone.

The second zone of the pair is measured in a similar manner, and the analog representation of its diameter is derived by means of variable resistor 114, and is converted to digital form by converter 23 and displayed by display 25.

After the second zone has been measured, the operator again momentarily depresses push button 38, causing converter 54 to shift to a third condition wherein line 70 is brought to a relatively low potential, causing illumination of lamp 71. At this time, the second readings are displayed respectively on displays 24 and 25, and a visual verification can be made by the operator. Ordinarily, the verification will be merely an observation that the numbers appearing on the displays are not unreasonable numbers, considering the general range of diameters of the zones being measured. The operator can also visually verify the display corresponding to a particular zone immediately following its measurement and before the initiation of the next impulse by operation of push button 48. At any time up to this point, assuming that the operator is not satisfied with the readings displayed on displays 24 and 25, he may shift switch 108 to reset the counter, and take new measurements.

If the operator is satisfied with the readings displayed on displays 24 and 25, he again depresses push button 48 to initiate a third impulse. Converter 54 shifts to a condition in which line 72 goes to a relatively low potential, allowing conduction through diode 74. The negative going signal at the A input of tape adding machine 38 causes the adding machine to record the information at the outputs of converters 32 and 33 simultaneously in the accumulator. In order to keep the two sets of readings isolated from each other in the accumulator of the tape adding machine, the adding machine is preferably set up so that the groups of digits are separated from each other by at least two orders of magnitude. Thus, a typical pair of readings on the tape would appear as 27200299, 272 being the diameter of a first zone and 299 being the diameter of the second zone in a pair. Thus separated, the readings may be added in the machine without confusion resulting from carrying.

During the adding machine cycle, a relatively high potential appears in line 76. At the end of the cycle, the negative going signal in line 76 triggers single shot 82, causing a pulse to be delivered to the P input of printer and tape perforator 42. The printer and tape perforator records the same information as was recorded in the accumulator of tape adding machine 38. At the end of the operation of printer and tape perforator 42, a signal is produced at its F output which triggers single shot 98, causing a short pulse at the input of oscillator 102 and at the resetting input of counter 52. A momentary audible tone is produced at loudspeaker 104 which indicates to the operator that the system is ready to receive another impulse corresponding to the first impulse. Thus, the operator may proceed with the reading and temporary storage of the diameter of the first zone of the next succeeding pair of zones.

As explained above, the negative going signal in line 76, produced at the completion of an adding machine cycle results in resetting of counter 52 and in the production of an audible indication by virtue of the fact that a pulse at the P input of printer and tape perforator 42 ultimately results in the production of a signal at its F output after the printer and tape perforator has gone through its operation. The printer and tape perforator, however, can be taken out of operation by the rotation of switch 88 ninety degrees counter-clockwise. This causes line 84 at the output of single shot 82 to be connected directly to the input of single shot 98.

In connection with the recording of a series of readings in tape adding machine 38, the operator may desire to determine an average. The divisor is displayed in display 116 by counter 114, which counts the number of recording operations of tape adding machine 38.

In summary, the data acquisition system in accordance with the invention provides for rapid and accurate antibiotic testing by greatly reducing the probability of human error and by automatically providing for the visual verifications of readings and their orderly recording. Numerous modifications to the apparatus specifically described herein will occur to persons skilled in the art. For example, the combination of counter 52 and converter 54 could be replaced by a ring counter; different numbers of analog-to-digital converters could be used in the system, depending upon the number of readings to be recorded simultaneously; and various different forms of recording means may be used in addition to or in replacement of the tape adding machine and the printer and tape perforator specifically described.

I claim:

1. A data acquisition system for use in antibiotic testing by the serial measurement of zones on a bacteria culture in which growth of bacteria is inhibited alternately by standard antibiotics, and antibiotics of unknown properties, comprising:
   means for successively measuring said zones, comprising means for producing an image of each of said zones, means providing a reference index, means for moving said image and said reference index relative to each other, and means for producing an electrical signal representative of the extent of such relative movement, whereby there may be produced for each zone an electrical representation of its diameter;
   first storage means, connected to said measuring means, for temporarily storing a representation of the diameter of a zone for the purpose of display of said representation;
   second storage means, connected to said measuring means, for temporarily storing a representation of the diameter of a zone for the purpose of display of said representation;
   means for displaying the representations stored in said first and second storage means;
   means, connected to said first and second storage means, for recording said representations; and
   sequencing means responsive to operator-initiated impulses for effecting temporary storage by said first storage means of a representation of the diameter of the first of a pair of successively measured zones upon the initiation of a first impulse, effecting temporary storage by said second storage means of a representation of the diameter of the second zone of said pair upon the initiation of a second impulse, and effecting recording of the stored representations by said recording means simultaneously upon the initiation of a third impulse.

2. A data acquisition system according to claim 1 in which the sequencing means includes means responsive to a series of identical impulses for effecting temporary storage by the first storage means of a representation of the diameter of the said first of a pair of successively measured zones upon the initiation of a first impulse in said series, effecting temporary storage of a representation of the diameter of said second zone upon the initiation of a second impulse in said series, and effecting recording of the stored representations simultaneously upon the initiation of a third impulse in said series.

3. A data acquisition system according to claim 1 in which the means for recording said representations includes means for providing a signal when recording of said representations has taken place, and including means responsive to said signal for resetting said sequencing means to a condition to receive another impulse corresponding to said first impulse.

4. A data acquisition system according to claim 1 in which the means for recording said representations includes means for providing a signal when recording of said representations has taken place, and including:
   means responsive to said signal for resetting said sequencing means to a condition to receive another impulse corresponding to said first impulse; and
   means also responsive to said signal for providing an indication that the data acquisition system is ready to receive another impulse corresponding to said first impulse.

5. A data acquisition system according to claim 1 including additional means for recording said representations, means for providing a signal when recording of said representations has taken place in the first-mentioned means for recording representations, and means responsive to said signal for effecting recording of the same representations by the additional recording means.

* * * * *